INVENTORS
Rollie B. Williams,
Rhoderick K. Saunders,
BY
*Carl G. Ries*
ATTORNEY.

INVENTORS.
Rollie B. Williams,
Rhoderick K. Saunders,
BY
*Carl G. Ries*
ATTORNEY.

United States Patent Office 2,909,483
Patented Oct. 20, 1959

2,909,483

DETERMINATION OF ASPHALTIC COMPONENTS OF PETROLEUM HYDROCARBONS BY MEASURING THE ELECTRICAL CONDUCTIVITY THEREOF

Rollie B. Williams and Rhoderick K. Saunders, Baytown, Tex., assignors, by mesne assignments, to Esso Research and Engineering Company, Elizabeth, N.J., a corporation of Delaware Application November 14, 1957, Serial No. 696,363

7 Claims. (Cl. 208—309)

This invention relates to a method for determining the quantity of asphaltene type hydrocarbons contained in a sample. More particularly, this invention relates to a method for quantitatively determining the asphaltenes content of a sample of a petroleum hydrocarbon fraction and to a method for regulating a process for treating the hydrocarbon fraction in response to the determination.

Petroleum crude oils and many petroleum hydrocarbon fractions are characterized by the presence of high molecular weight asphaltenes. Such asphaltenes are undesirable feed components for many hydrocarbon treating processes, such as hydrocarbon cracking processes, and therefore are desirably excluded from the feed stock by suitable means such as fractional distillation, deasphalting, etc.

Asphaltic hydrocarbon components tend to be insoluble in light hydrocarbon fractions such as paraffinic naphtha fractions and therefore asphaltene hydrocarbon determinations are normally made on the basis of time-consuming solubility tests.

It has been discovered in accordance with the present invention that when a liquid, asphaltenes-containing hydrocarbon sample is employed as an electrically conducting medium for electrically interconnecting spaced electrodes of an electrical system, an electrical current will pass through the medium with an intensity of current flow responsive to the quantity of asphaltenes components in the sample.

In general, the current passing through the sample between the spaced electrodes for a given configuration of electrodes and for a given applied voltage is proportional to asphaltenes content and inversely proportional to the viscosity of the sample. Therefore, it is generally preferable to conduct asphaltenes measurements while the sample is in a free-flowing condition. Many asphaltenes-containing samples are free-flowing at room temperatures. Samples that are excessively viscous at room temperature may be heated to a temperature sufficient to provide a free-flowing material. Alternately, and as a matter of convenience, the sample may be diluted with a low molecular weight solvent such as naphtha, kerosene, benzene, carbon disulfide, etc., the amount of solvent employed preferably being such that the solution contains less than about 10 weight percent of asphaltenes. In this case and under standardized conditions, the current is proportional to the concentration of sample per unit volume of solution.

Thus, in accordance with the present invention, the electrical conductivity of an asphaltenes-containing petroleum hydrocarbon sample is determined to obtain a measure of the quantity of asphaltenes present in the sample. In accordance with a preferred form of the present invention the measurement of electrical conductivity is made under standardized predetermined conditions of substantially constant sample temperature and substantially constant sample viscosity with a testing device of predetermined standardized construction whereby the measurement of the electrical conductivity of the sample provides a direct quantitative determination of the asphaltenes content of the sample. As indicated, substantially constant sample viscosity is preferably provided by diluting an asphaltenes-containing source material (sample) with an amount of low molecular weight hydrocarbon sufficient to provide a solution for testing which contains less than about 10 weight percent of sample. In accordance with a modified form of the invention, sample temperature is maintained constant and the sample viscosity and electrical conductivity are determined whereby a direct quantitative measurement of asphaltenes content is obtained. In some situations it may be desirable to independently measure sample temperature, sample viscosity and sample electrical conductivity in determining the asphaltenes content of the sample.

In accordance with a preferred form of the present invention, a continuous process for the treatment of an asphaltenes-containing petroleum hydrocarbon fraction is regulated by periodically or continuously sampling a treating process hydrocarbon stream, by determining the asphaltenes content of such samples and by continuously regulating a treating process variable in response to such determination.

The present invention will be further illustrated by the following specific examples and the accompanying drawings which are given by way of illustration and which are not intended as limitations on the scope of this invention.

Figure 4:
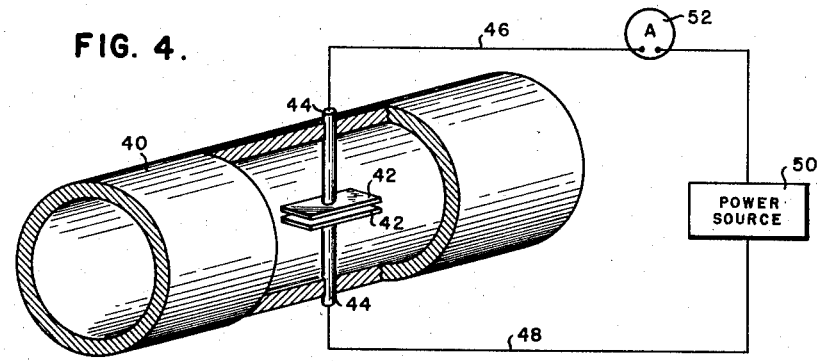
Figure 5:
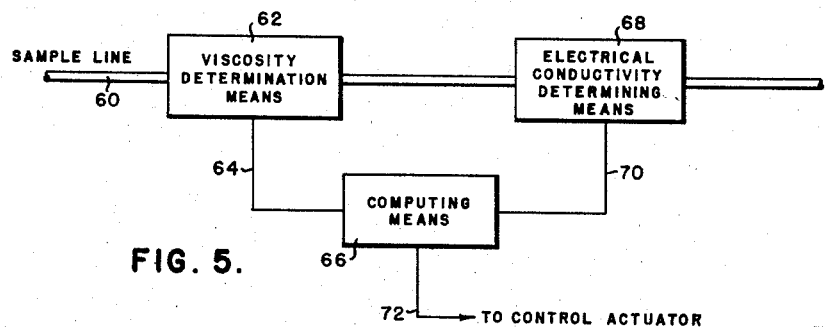

Fig. 4 is a schematic perspective showing, partly in section, one manner in which the electrical conductivity of an asphaltic hydrocarbon sample may be detected in accordance with the present invention; and Fig. 5 is a fragmentary schematic diagram illustrating another manner in which the asphaltic content of a hydrocarbon sample may be detected in a continuous manner in accordance with the present invention.

EXAMPLE I

A wide variety of asphalt-containing hydrocarbon fractions were dissolved in benzene. Each of the thus-prepared samples was then placed in a cell containing parallel brass electrodes spaced apart by a distance of approximately 10 mm. Each of the electrodes had an area of approximately 580 mm.$^2$. The electrodes were connected with a 90 volt D.C. source and the current passing between the electrodes was measured with a sensitive microampmeter at room temperature.

The samples tested and the results obtained are set forth in Table I.

Table I

| Column 1 Sample | Column 2 Wt. Percent Asphaltenes by Prior Art Analysis (Solvent Precipitation) | Column 3 Concentration, Gms./L., in Benzene | Column 4 Current, Microamperes | Column 5 Conductance, $\frac{\mu a.}{Conc.} \times 100$ | Column 6 Wt. Percent Asphaltenes Based on Electrical Conductance Measurements (Fig. 1) |
|---|---|---|---|---|---|
| Los Angeles Basin Visbreaker Bottoms | 59 | 42.4 | 50.0 | 118 | 61.5 |
| Los Angeles Basin Deasphalted Pitch | 50 | 40.7 | 34.6 | 85 | 46.5 |
| Trinidad Residuum | 43 | 39.8 | 27.0 | 68 | 39.0 |
| Ordones Residuum | 31 | 46.1 | 25.3 | 55 | 32.5 |
| Pontiac Residuum | 39 | 40.4 | 20.1 | 50 | 30.0 |
| Los Angeles Basin Residuum | 20 | 44.1 | 17.7 | 40 | 25 |
| Magnolia Residuum | 10 | 44.5 | 16.0 | 36 | 22.5 |
| Santa Maria Residuum | 31 | 47.9 | 16.1 | 34 | 21.5 |
| Coleville Bottoms | 20 | 53.8 | 16.0 | 30 | 19 |
| West Coast Residuum | 21 | 40.6 | 12.1 | 30 | 19 |
| Caminol Residuum | 11 | 55.3 | 10.4 | 19 | 13 |
| Casabe Residuum | 8 | 47.0 | 8.2 | 17 | 11 |
| West Texas Residuum | 10 | 47.2 | 6.4 | 14 | 9 |
| Kuwait Residuum | 14 | 44.6 | 5.94 | 13 | 8.5 |
| S. Louisiana Bottoms | 5 | 44.5 | 4.90 | 11 | 7.5 |
| Aramco Residuum | 6 | 57.7 | 5.53 | 10 | 7 |
| Panhandle Bottoms | 1 | 52.7 | 3.90 | 7 | 5 |

Figure 1:
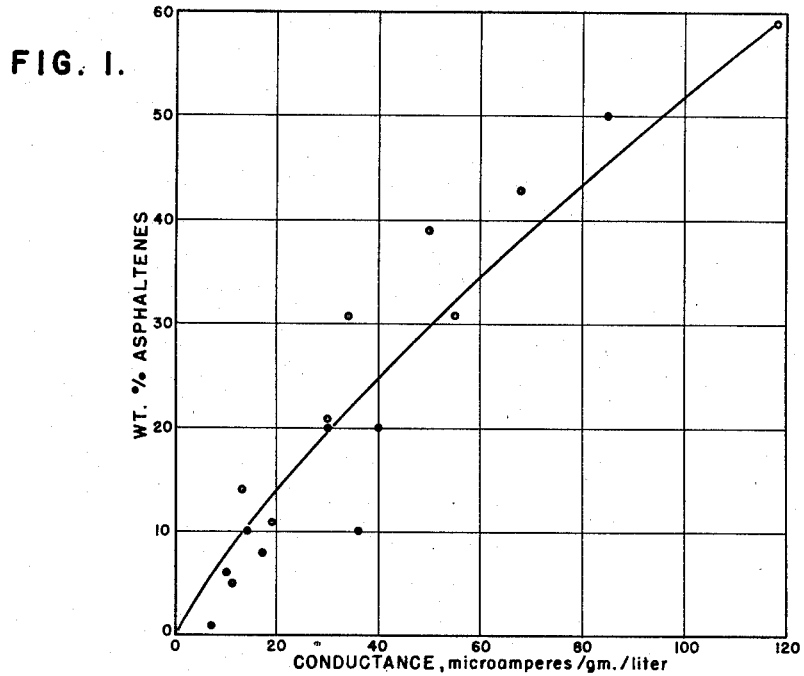
Fig. 1 is a graph showing the interrelationship of the electrical current, per unit concentration in solution, of asphaltenes-containing samples from a wide variety of sources with respect to the asphaltenes content of such samples.

The asphaltenes content of each of the samples had been previously determined, such content being reported in column 2 of Table I. Based on the conductances of column 5, a graph of asphaltenes content versus conductance was prepared as shown in Fig. 1 of the attached drawing. The asphaltenes content of the samples as indicated by Fig. 1 is set forth in column 6 of Table I.

EXAMPLE II

A variety of asphalt-containing hydrocarbon fractions derived from a West Texas crude oil were dissolved in carbon disulfide. Brass electrodes having a surface area of approximately 580 mm.$^2$ were immersed in each of the samples and spaced apart a distance of approximately 10 mm. The electrodes were connected with a D.C. source and the current passing between the electrodes was measured with a sensitive microampmeter at room temperature. The samples tested and the results obtained are set forth in Table II.

Table II
ASPHALTENES CONTENT OF SAMPLES DERIVED FROM WEST TEXAS RESIDUUM

| Sample | Asphaltenes Content, Wt. Percent (By Prior Art Analysis) | Conc., Gms./Liter | Current, Microamperes | Conductance, $\frac{Current}{Conc.} \times 100$ | Wt. Percent Asphaltenes from Fig. 2 |
|---|---|---|---|---|---|
| West Texas Residuum | 6.87 | 110.2 | 5.33 | 4.84 | 8 |
| Catalytic Cracking Product [1] | 5.06 | 73.96 | 1.10 | 1.49 | 3 |
| Deasphalted Oil Derived from West Texas Residuum | 2.89 | 73.71 | 2.68 | 3.64 | 5 |
| Do | 0.08 | 132.8 | 0.03 | 0.022 | |
| Do | 0.00 | 117.5 | 0.03 | 0.025 | |
| Asphalt Derived from West Texas Residuum | 59.8 | 41.05 | 24.6 | 59.9 | 60 |
| Do | 20.58 | 40.35 | 7.1 | 17.6 | 20 |

[1] Residuum fraction resulting from fractional distillation of the products formed by catalytic cracking of a West Texas feed stock.

Figure 2:
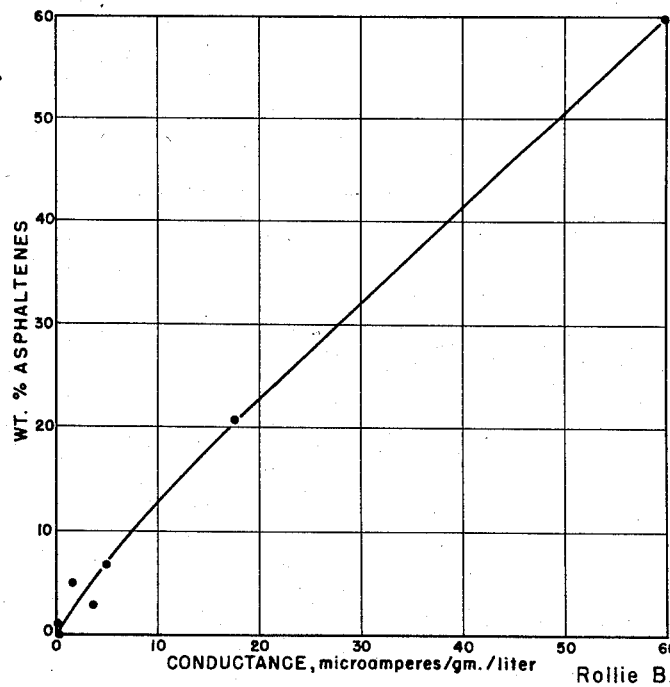
Fig. 2 is a graph illustrating the interrelationship of electrical current, per unit concentration in solution, to asphaltenes content of samples derived from a single source.

Based on the data of Table II, a graph of asphaltenes content versus conductance was prepared as shown in Fig. 2 of the attached drawings.

The manner in which a petroleum hydrocarbon treating process may be regulated in accordance with the present invention is illustrated with reference to Figs. 3 and 5.

Figure 3:
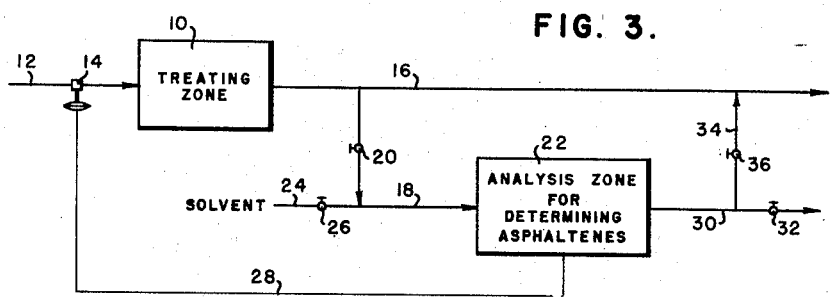
Fig. 3 is a schematic diagram indicating one manner in which a process for treating an asphaltic hydrocarbon may be regulated in accordance with the present invention.

Turning next to Fig. 3, there is shown a treating zone 10 for treating an asphaltic petroleum hydrocarbon fraction. Treating zone 10 may be, for example, a solvent deasphalting zone for deasphalting an asphaltic hydrocarbon feed stock with a solvent such as a liquefied normally gaseous hydrocarbon, liquefied sulfur dioxide, etc. to obtain a deasphalted oil suitable for catalytic cracking, a distillation zone for separating an asphaltenes-free distillate fraction from an asphaltic feed stock, a blending zone wherein an asphaltic hydrocarbon fraction derived from a petroleum refining process (e.g., catalytic cracking, distillation, etc.) is blended with a non-asphaltic fuel oil fraction to provide a furnace fuel, etc.

An asphaltenes-containing hydrocarbon feed stock is charged to the treating zone 10 by way of a charge line 12 regulated by suitable means such as an electrically or pneumatically actuatable valve 14. Although only a single charge line for the treating zone 10 is shown in Fig. 3, it will be understood that in practice one or a plurality of charge streams may be charged to the treating zone 10, depending upon the particular treating process to be conducted therein. A treating process product stream is discharged from the zone 10 by way of a line 16. It will be understood that in many processes a plurality of discharge streams (not shown) may be discharged from the treating zone 10.

In accordance with the present invention, the product stream 16 is sequentially sampled (on an intermittent or continuous basis) by way of a sample line 18 controlled by a valve 20 leading to an analysis zone 22. If desired, a suitable solvent may be blended with the sample in the line 20, the solvent being charged by way of a line 24 controlled by a valve 26.

The electrical resistivity of the sample is measured in the zone 22 and an electrical signal responsive to sample resistivity is transmitted by an electrical conductor 28 to the actuating means for the valve 14 in the charge line 12.

The sample material, after analysis, may be discharged from the analysis zone by way of the discharge line 30 controlled by a valve 32 for discharge from the system or alternately, for example, may be returned to the discharge line 16 by way of a line 34 controlled by a valve 36.

As a specific example, the treating zone 10 may be a deasphalting zone wherein a hydrocarbon residuum fraction is treated with a liquefied normally gaseous hydrocarbon solvent under conditions of temperature, contact time, and solvent-to-oil ratio sufficient to provide for the obtaining of a deasphalted oil fraction suitable for catalytic cracking and an asphalt fraction.

One manner in which the electrical conductivity of an asphaltenes-containing stream may be determined in a continuous manner is shown in Fig. 4. Thus, in situations wherein the feed to be sampled is a stream which continuously flows through a conduit 40, there may be placed within the conduit 40 spaced electrodes 42—42 supported on the conduit 40 by means of hollow support rods 44—44 electrically insulated from the conduit 40. Electrical connections 46 and 48 connected with a suitable power source for electrical energy 50 (either A.C. or D.C.) are passed through the openings of support rods 44—44 and connected with the electrodes 42—42. Suitable means of any construction, such as an ammeter 52 may be interconnected with the electrical conductivity measuring circuit in any suitable manner to detect the intensity of current flow in the circuit.

In accordance with this embodiment, the sample material flowing through the conduit 40 is maintained at a substantially constant viscosity and temperature whereby the electrical conductivity determination constitutes a direct measure of the asphaltenes content of the sample.

As another example, and in situations wherein the sample will be of unknown non-constant viscosity, there may be provided a sample line 60 fluidly interconnected with a suitable viscosity determination means 62 of any suitable construction for determining the viscosity of the sample. The viscosity determining means is preferably of a construction such that there is provided an output electrical signal transmitted by way of an electrical signal 64 to a computing means 66. The electrical conductivity of the sample of material flowing through the line 60 is separately measured by suitable electrical conductivity determining means 68 of any desired construction such as a determining means of the type shown in Fig. 4. An electrical output signal from the electrical conductivity determining means 68 is transmitted by way of an electrical connection 70 to the computing means 66 wherein sample viscosity and electrical conductivity are correlated to provide an output signal which may be transmitted by an electrical connection 72 to any suitable control actuator (not shown).

In a typical solvent deasphalting operating it may be desirable to regulate deasphalting operations in a manner to provide for the presence of from about 0.1 to 1 weight percent of asphaltenes in the deasphalted oil, this being done in order to insure the recovery of a maximized amount of useful non-asphaltic components or to exclude a maximized amount of asphaltic components. In this situation, the electrical conductivity of the discharge stream 16 is sequentially determined (on a continuous or intermittent basis) to determine the asphaltenes content thereof and if the asphaltenes content falls either above or below the predetermined range, the deasphalting process variable may be altered in response to determination to provide for the desired asphaltenes content. Among the deasphalting process variables that may be regulated are solvent-to-feed stock ratio, temperature, solvent composition, etc.

Having described our invention, what is claimed is:

1. A method for determining the asphaltenes content of an asphaltic hydrocarbon sample which comprises dissolving said sample in an amount of a solvent sufficient to provide a free-flowing solution and then measuring the electrical conductivity of said solution to thereby obtain a measurement of the asphaltenes content of said sample.

2. A method as in claim 1 wherein the solvent is an aromatic hydrocarbon.

3. A method as in claim 2 wherein the aromatic hydrocarbon is benzene.

4. In a process for continuously treating an asphaltic hydrocarbon feed stock, the improved method for regulating said treating process which comprises the steps of sequentially sampling a treating process stream, sequentially measuring the electrical conductivity of the thus-obtained samples under predetermined analysis conditions and controlling a hydrocarbon treating process variable in response to said measurement of electrical conductivity.

5. A method as in claim 4 wherein the treating process is a solvent deasphalting process.

6. In a process wherein an asphaltic petroleum hydrocarbon feed stock is deasphalted by contact with a liquefied normally gaseous hydrocarbon to separate said feed stock into an asphaltic fraction and a deasphalted oil fraction, the improved method for regulating said deasphalting operation which comprises the steps of obtaining a sample of said deasphalted oil, measuring the electrical conductivity of said sample under predetermined conditions and regulating a deasphalting process variable in response to said conductivity measurement.

7. A method as in claim 6 wherein the ratio of liquefied normally gaseous hydrocarbon to asphaltic feed stock is regulated in response to the conductivity measurement.

References Cited in the file of this patent

UNITED STATES PATENTS

| | | |
|---|---|---|
| 2,211,704 | Robinson | Aug. 13, 1940 |
| 2,737,469 | Anderson et al. | Mar. 6, 1956 |